Patented Dec. 5, 1939

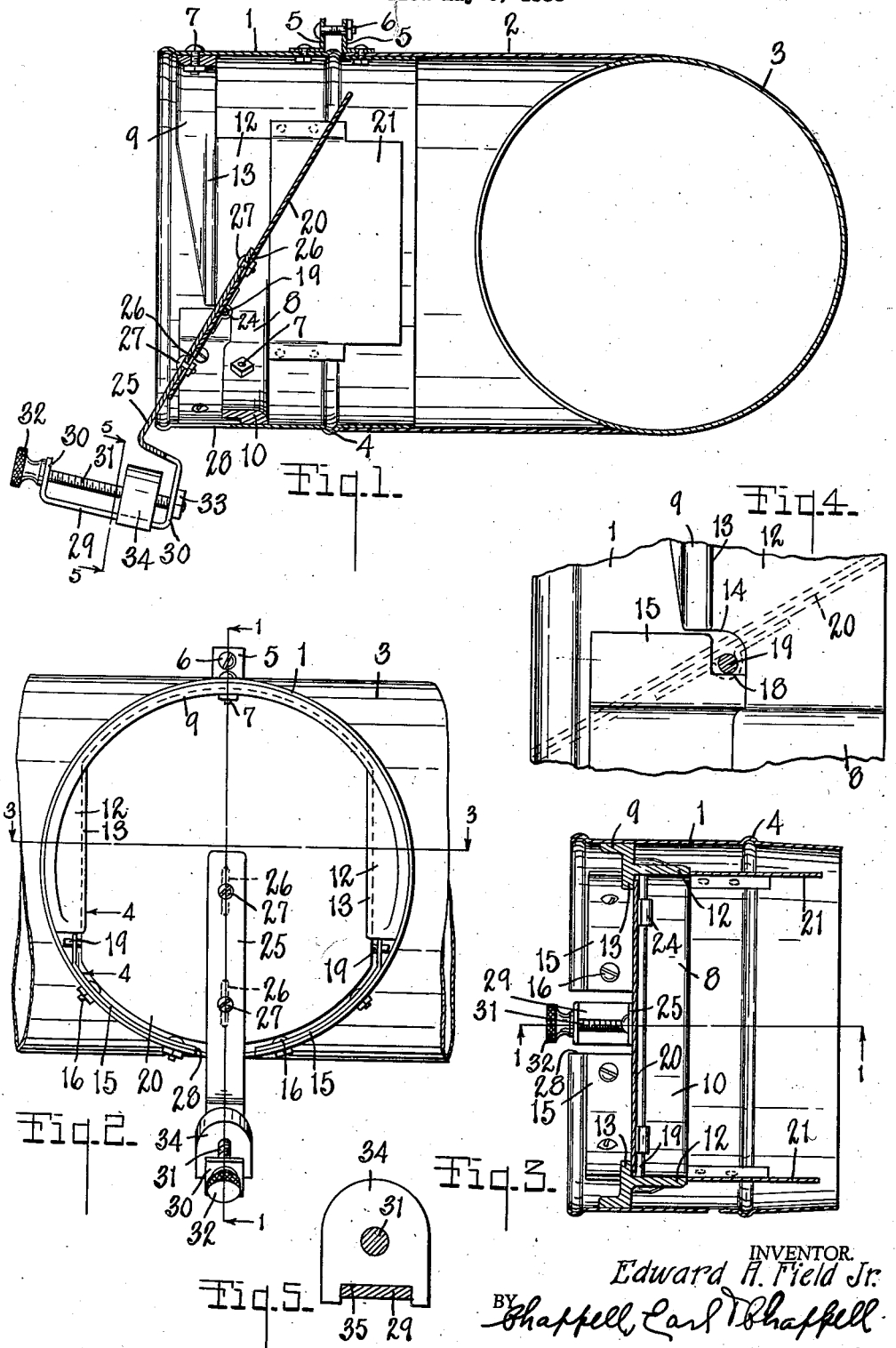

2,182,625

UNITED STATES PATENT OFFICE 2,182,625

DRAFT CONTROL

Edward A. Field, Jr., Chicago, Ill.

Application May 6, 1936, Serial No. 78,263

20 Claims. (Cl. 236—45)

This invention relates to improvements in draft control.

The main objects of this invention are:

First, to provide a draft control of improved construction for regulating the flow of air into a flue.

Second, to provide a control of the type described, embodying a pivoted gate, wherein the area of the opening through the control housing is in proportion to a function of the angle of inclination of the gate under the influence of barometric pressure tending to open the same.

Third, to provide a control of the type described having a gate mounted in an improved substantially frictionless manner.

Fourth, to provide a control of the type described having novel adjustable regulating means therefor.

Fifth, to provide a control of the type described characterized by its simplicity and economy of construction and efficiency in action.

Further objects relating to details and economies of my invention will definitely appear from the description to follow. The invention is defined in the claims.

A preferred embodiment of my invention is illustrated in the accompanying drawing, wherein:

Fig. 1 is a sectional view on the line 1—1 of Figs. 2 and 3, of a draft control embodying my invention.

Fig. 2 is a fragmentary front elevation further illustrating details of my construction.

Fig. 3 is a sectional view on the line 3—3 of Fig. 2.

Fig. 4 is an enlarged fragmentary sectional view illustrating a detail of my gate mounting, taken on a line corresponding to line 4—4 of Fig. 2.

Fig. 5 is a sectional view on line 5—5 of Fig. 1, showing details of the adjustable counterweight.

Certain draft controls are inefficient or ineffective in securing uniformity of control because of the employment of a cylindrical housing with a disk-like circular gate, having its axis somewhat above or below the center of the gate in order that there be a difference in pressure on the upper and lower portions of the gate, which difference causes the opening of the gate. It will be apparent that the diameter of the gate must be reduced in order to permit its swinging without striking the sides of the cylindrical housing, inasmuch as it is eccentrically pivoted. This results in a flow of air around the whole circumference of the gate as soon as it leaves its closed position, with the result that the area of the opening through such a draft control does not increase in proportion to the degree of opening of the gate. This not only causes lack of uniformity or accuracy in control, but also makes it difficult or impossible to provide any sort of counterweight producing proper closing torque for all gate positions.

By my invention, I have eliminated these as well as other undesirable features, as will appear in detail from the description to follow.

My draft control in the embodiment illustrated consists of a circular housing made up of cylindrical pipe-like sections 1 and 2 adapted to be mounted on or connected with a smoke flue 3 having a side opening through which the housing communicates with the flue. The sections have telescoping engagement, the section 1 being provided with a joint bead 4. The sections are provided with coupling ears 5 receiving the bolt 6.

Within the housing at its front end, I mount by means of bolts 7 a circular frame 8 in the form of a casting. This frame comprises an upper arcuate reach or segmental portion 9 offset forwardly from the lower arcuate reach or segmental portion 10 joined by inwardly projecting wing or side portions 12 conformed to provide stops 13 for the gate. These wing portions are substantially parallel. The annular casting fits within the housing, preferably formed of sheet metal, and is bolted thereto. Thus conformed, the frame 8 is undercut at 14 to receive the pintle 19 of the gate 20.

To support the gate, I provide arcuate supporting strips 15 secured to the interior of the housing at either side thereof as by means of bolts 16, the supports being provided with notched upper edges providing bearings 18 with which the pintle 19 has rolling engagement. The pintle 19 preferably projects sufficiently from the edges of the gate to barely contact or touch the inner wall of the housing, thereby preventing axial movement of the pintle and preventing the side edges of the gate from coming into rubbing contact with the frame or with the sides or wings 21 extending rearwardly from the frame. These side plates or wings are secured to the housing so as to form extensions for the portions 12 of the frame and so that the gate swings between them as it opens and closes.

The gate is formed with cylindrically curved top and bottom edges and straight substantially parallel side edges. The pintle is preferably formed integrally and secured to the rear side of the gate by means of the straps 24. The gate carries a depending strap or arm 25 which, in the preferred embodiment illustrated, is adjustably secured to the gate by providing the gate with slots 26 which are engaged by the arm securing screws 27. The diameter of the gate is nearly as great as that of the housing, assuring a close fit.

The fact that segments of the gate are removed at each side and the fact that the housing is, in effect, filled in by the plates 21 and the side portions of the frame permit the axis or pintle of the gate to be located substantially remote from the center of the gate, yet at the same time the gate can fit the inside of the housing closely. When the gate opens, there is an open area only at the top and bottom and substantially none at the sides. Further, locating the axis of the gate a substantial, rather than a slight, distance from the center, there is a much greater difference in the area between the upper and lower effective portions of the gate, so that the force of the air has a greater effect on the gate and there is less likelihood of of the gate's becoming stuck. The rolling supporting bearings for the pintle minimize the possibility of the pintle's becoming stuck or clogged.

A further advantage of this form of gate and housing is that the area of the opening varies directly in accordance with a function of the degree of opening of the gate; that is, it is proportional to a function of the angle of inclination of the gate or to the versed sine of the angle between the plane of the gate and a vertical plane. Thus, it is possible to make simple provision for closely governing or controlling the gate, and I have devised a simple counterweight means for bringing about an adjustable control of the gate.

In the embodiment illustrated, this control means consists of the arm 25 which projects downwardly and swings into the slot 28 in the housing when the gate is in its closed position. The lower end of the arm is bent rearwardly and secured to the rear arm of an upwardly facing yoke comprising a bight portion 29 and front and rear arms 30 carrying the screw 21, the screw having a finger piece 32 at its front end and a nut 33 at its rear end. The nut is provided merely for rotatively securing the screw in the yoke. The weight 34 has threaded engagement with the screw and is notched at 35 to receive the bight portion of the yoke, thus slidably supporting the weight and providing its rotative movement as the screw is manipulated to move the weight forward to adjust the weight. The offsetting of the yoke on the arm positions the weight carrying yoke, so that the center of gravity is such that when the gate is closed and the weight adjusted to its innermost position very little force is required to open the gate and very accurate gauging may be had by the adjustment of the weight.

The structure of my invention, and particularly the gate of the same, is exceedingly sensitive to draft changes. The pintle 19, which forms the axis of the gate, does not rotate in a journal, but instead rolls on horizontal bearing surfaces 18, substantially eliminating friction and materially contributing to the sensitivity of my device. Objectionable end play in the pintle is taken up by the construction of the same of sufficient length to just touch the sides of the housing 1.

From the above description, it will be seen that the details of draft control construction which previously gave rise to variations in air flow, which could not be compensated for, have been entirely corrected. By the structure herein disclosed, the flow of air is constant relative to the angular opening. Hence, adjustments are likewise facilitated, with the result that sensitiveness to operation and to adjustment, as well as ease of adjustment, is increased.

I have illustrated and described my improvements in an embodiment which I have found very practical. I have not attempted to illustrate or describe other embodiments or adaptations as it is believed this disclosure will enable those skilled in the art to embody or adapt my improvements as may be desired.

Having thus described my invention, what I claim as new and desire to secure by Letters Patent is:

1. In a draft control, the combination of a cylindrical sheet metal housing adapted for attachment to a smoke flue, an annular gate frame casting secured within said housing and provided with opposed segmental inwardly projecting wing portions having substantially parallel vertical edges, said casting being undercut below said wing portions, a gate having cylindrically curved top and bottom edges and substantially parallel vertical side edges and provided with eccentrically disposed pivots, gate supports secured within said housing in front of said casting and having shouldered pivot supporting edges disposed below said wing portions of said casting, the pivots having rolling engagement with their said supports, a counterweight arm adjustably secured to said gate to project downwardly therefrom and having a rearwardly projecting portion at its lower end, an upwardly facing yoke secured by its rear arm to the rear end of said arm, said housing being provided with a slot at the bottom to receive said arm, a counterweight recessed at the bottom to receive the bight portion of said yoke, a screw rotatable in the arms of the yoke and having threaded engagement with said counterweight, and side plates beween which said gate swings on its pivots and which extend rearwardly from said wing portions of said casting.

2. In a draft control, the combination of a housing adapted for attachment to a smoke flue, an annular gate frame secured within said housing and provided with opposed segmental inwardly projecting wing portions having substantially parallel vertical edges, a gate having cylindrically curved top and bottom edges and substantially parallel vertical side edges and provided with eccentrically disposed pivots, gate supports secured within said housing in front of said frame and having shouldered pivot supporting edges disposed below said wing portions of said frame, the pivots having rolling engagement with their said supports, a counterweight arm adjustably secured to said gate to project downwardly therefrom and having a rearwardly projecting portion at its lower end, an upwardly facing yoke secured by its rear arm to the rear end of said arm, said housing being provided with a slot at the bottom to receive said arm, a counterweight recessed at the bottom to receive the bight portion of said yoke, a screw rotatable in the arms of the yoke and having threaded engagement with said counterweight, and side plates between which said gate swings on its pivots and which extend rearwardly from said wing portions of said frame.

3. In a draft control, the combination of a cylindrical sheet metal housing adapted for attachment to a smoke flue, an annular gate frame casting secured within said housing and provided with opposed segmental inwardly projecting wing portions having substantially parallel vertical edges, said casting being undercut below said wing portions, a gate having cylindrically curved top and bottom edges and substantially parallel vertical side edges and provided with eccentrically disposed pivots, gate supports secured within said housing in front of said casting and having shouldered pivot supporting edges disposed below said wing portions of said casting, the pivots having rolling engagement with their said supports, a counterweight arm secured to said gate to project downwardly therefrom, a counterweight on said arm, and side plates between which said gate swings on its pivots and which extend rearwardly from said wing portions of said casting 4. In a draft control, the combination of a housing adapted for attachment to a smoke flue, an annular gate frame secured within said housing and provided with opposed segmental inwardly projecting wing portions having substantially parallel vertical edges, a gate having cylindrically curved top and bottom edges and substantially parallel vertical side edges and provided with eccentrically disposed pivots, gate supports secured within said housing in front of said frame and having shouldered pivot supporting edges disposed below said wing portions of said frame, the pivots having rolling engagement with their said supports, a counterweight arm secured to said gate to project rearwardly therefrom, a counterweight on said arm, and side plates between which said gate swings on its pivots and which extend rearwardly from said wing portions of said frame.

5. In a draft control, the combination of a cylindrical sheet metal housing adapted for attachment to a smoke flue, an annular gate frame casting secured within said housing and provided with opposed segmental inwardly projecting wing portions having substantially parallel vertical edges, a gate having cylindrically curved top and bottom edges and substantially parallel vertical side edges and provided with eccentrically disposed pivots, a counterweight arm secured to said gate to project downwardly therefrom and having a rearwardly projecting portion at its lower end, an upwardly facing yoke secured by its rear to the rear end of said arm, said housing being provided with a slot at the bottom to receive said arm, a counterweight recessed at the bottom to receive the bight portion of said yoke, a screw rotatable in the arms of the yoke and having threaded engagement with said counterweight, and side plates between which said gate swings on its pivots and which extend rearwardly from said wing portions of said casting.

6. In a draft control, the combination of a cylindrical sheet metal housing adapted for attachment to a smoke flue, an annular gate frame casting secured within said housing and provided with opposed segmental inwardly projecting wing portions having substantially parallel vertical edges, a gate having cylindrically curved top and bottom edges and substantially parallel vertical side edges and provided with eccentrically disposed pivots, a counterweight arm secured to said gate to project downwardly therefrom, a counterweight on said arm, and side plates between which said gate swings on its pivots and which extend rearwardly from said wing portions of said casting.

7. In a draft control, a housing, a gate pivotally mounted therein, and a counterbalance for said gate comprising an arm secured to the gate for adjustment parallel to the plane of the gate and bent to provide a guide track, an adjusting screw journaled in said arm, and a weight threaded on said screw to travel along said track, said weight having a groove engaging said track to prevent rotation of the weight.

8. In a draft control, a housing, a gate pivotally mounted therein, and a counterbalance for said gate comprising an arm secured to the gate and bent to provide a guide track, and an adjustable weight mounted to travel along said track, said weight having a groove engaging said track to prevent rotation of the weight.

9. In a draft control, a cylindrical housing, a substantially circular gate in said housing, a pintle eccentrically secured to said gate, and means for supporting said gate for free pivotal movement in said housing, comprising a pair of arcuate strips fixed to said housing and having alined notched portions, said pintle being received in said portions, and means secured to the housing to retain the pintle in said notched portions, said pintle being sufficiently long to just touch the housing at its ends whereby end play of the pintle is eliminated.

10. In a draft control, a housing, a gate in said housing, a trunnion secured to said gate, and means for supporting said gate for free pivotal movement in said housing, comprising a pair of strips fixed to said housing and having alined notched portions, said trunnion being received in said portions, and means secured to the housing to retain the trunnion in said notched portions, said trunnion being sufficiently long to just touch the housing at its ends whereby end play of the trunnion is eliminated.

11. In a draft control, a housing, a gate in said housing, a trunnion secured to said gate, and means for supporting said gate for free pivotal movement in said housing, comprising a pair of strips fixed to said housing and having alined notched portions, said trunnion being received in said portions for rolling movement, and means secured to the housing to retain the trunnion in said notched portions.

12. In a draft control, a housing, a gate, a pintle secured to said gate, and means for supporting said gate for free pivotal movement in said housing, comprising means secured to said housing and having alined horizontal bearing surfaces for said pintle, said pintle being received on said surfaces for rolling movement, and means secured to the housing to retain the pintle on said surfaces, said pintle being sufficiently long to just touch the housing at its ends whereby end play of the pintle is eliminated.

13. In a draft control, a housing, a gate, a pintle secured to said gate, and means for supporting said gate for free pivotal movement in said housing, comprising means secured to said housing and having alined horizontal bearing surfaces for said pintle, said pintle being received on said surfaces for rolling movement, and means secured to the housing to retain the pintle on said surfaces.

14. In a draft control, the combination of a housing adapted for attachment to a smoke flue, a gate frame secured within said housing and provided with opposed inwardly projecting side wing portions having substantially parallel vertical edges, said frame being undercut below said wing portions, a gate provided with an eccentrically disposed pivot, gate supports secured within said housing in front of said frame and having shouldered pivot supporting edges disposed below said wing portions of said frame, the pivots having rolling engagement with their said supports, a counterweight for said gate, and side plates between which said gate swings on its pivots and which extend rearwardly from said wing portions of said frame, the gate closing against said gate frame.

15. In a draft control, the combination of a housing adapted for attachment to a smoke flue, a gate frame secured within said housing and provided with opposed inwardly projecting side wing portions having substantially parallel vertical edges, said frame being undercut below said wing portions, a gate provided with an eccentrically disposed pivot supported in the undercut in said wing portions, a counterweight for said gate, and side plates between which said gate swings on its pivots and which extend rearwardly from said wing portions of said frame.

16. In a draft control, a housing, a gate therefor, and means for supporting the gate for free pivotal movement in the housing, comprising trunnions on the gate and means secured to the housing and having alined horizontal bearing surfaces for said trunnions, said trunnions being received on said surfaces for rolling movement and being sufficiently long to just touch the housing at their ends whereby end play of the gate is eliminated.

17. In a draft control, the combination of a cylindrical housing adapted for attachment to a smoke flue, an annular gate frame secured at the front end of said housing and comprising opposed curved top and bottom portions and opposed segmental inwardly projecting wing portions having substantially parallel vertical edges, a gate pivotally mounted on said frame and having cylindrically curved top and bottom edges and substantially parallel vertical side edges, side plates extending rearwardly from said wing portions of said frame and between which said gate swings on its pivots, and a counterweight for said gate.

18. In a draft control, the combination of a sheet metal housing adapted for attachment to a smoke flue, an annular gate frame casting secured at the front end of said housing and provided with opposed segmental inwardly projecting wing portions and having substantially parallel vertical edges, a gate having curved top and bottom edges complementary to the said segmental wing portions and straight side edges corresponding to the vertical edges of said casting, side plates between which said gate swings on its pivots and which extend rearwardly from said wing portions of said casting, and a counterweight for said gate.

19. In a draft control, the combination of a cylindrical sheet metal housing adapted for attachment to a smoke flue, an annular gate frame casting secured at the front end of said housing and provided with opposed segmental inwardly projecting wing portions having substantially parallel vertical edges, a gate having cylindrically curved top and bottom edges and substantially parallel vertical side edges and provided with eccentrically disposed pivots, side plates between which said gate swings on its pivots and which extend rearwardly from said wing portions of said frame, and a counterweight for said gate.

20. In a draft control, the combination of a cylindrical housing adapted for attachment to a smoke flue, an annular gate frame secured at the front end of said housing and comprising opposed segmental wing portions having substantially parallel vertical edges, a pivoted gate having straight substantially parallel side edges corresponding to the said vertical edges of said wing portions of said frame and curved top and bottom edges complementary to the said segmental wing portions, side plates between which said gate swings on its pivots and which extend rearwardly from said wing portions of said frame, and a counterweight for said gate.

EDWARD A. FIELD, JR.